(12) United States Patent
Chatterjee et al.

(10) Patent No.: US 8,138,717 B2
(45) Date of Patent: Mar. 20, 2012

(54) ELECTRICAL CONNECTION BETWEEN DEVICES

(75) Inventors: Monique Chatterjee, Seattle, WA (US);
Daniel L. Odell, Kirkland, WA (US);
Chris A. Murzanski, Gilbert, AZ (US);
Carlos Manzanedo, Kirkland, WA (US);
Victor E. Shiff, Woodinville, WA (US);
William J. Selph, Redmond, WA (US);
David L. French, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/757,219

(22) Filed: Apr. 9, 2010

(65) Prior Publication Data

US 2010/0194350 A1 Aug. 5, 2010

Related U.S. Application Data

(63) Continuation of application No. 11/763,951, filed on Jun. 15, 2007, now Pat. No. 7,722,358.

(51) Int. Cl.
*H02J 7/00* (2006.01)
*H02J 7/16* (2006.01)
*G06F 3/033* (2006.01)
*H01R 11/30* (2006.01)

(52) U.S. Cl. ........ 320/107; 320/110; 320/114; 320/128; 345/163; 439/38; 439/39; 439/40

(58) Field of Classification Search .................. 320/108, 320/114, 111, 115, 107, 110, 128, 137; 455/74.1, 455/73, 343.1; 345/163, 166, 169, 173, 156, 345/157; 439/39
See application file for complete search history.

(56) References Cited

U.S. PATENT DOCUMENTS

| | | | |
|---|---|---|---|
| 3,146,049 A | 8/1964 | Sloop | |
| 5,941,729 A | 8/1999 | Sri-Jayantha | |
| 6,445,379 B1 | 9/2002 | Liu et al. | |
| 6,498,458 B1 | 12/2002 | Chen | |
| 6,747,633 B2 | 6/2004 | Jzuhsiag | |
| 6,750,851 B2 * | 6/2004 | Yang | 345/169 |
| 6,908,324 B1 | 6/2005 | Morley et al. | |
| 6,909,421 B2 * | 6/2005 | Wang | 345/163 |
| 7,158,116 B2 | 1/2007 | Poltorak | |
| 7,351,066 B2 | 4/2008 | DiFonzo et al. | |
| 2003/0151593 A1 | 8/2003 | Hong | |
| 2003/0160762 A1 * | 8/2003 | Lu | 345/163 |

(Continued)

FOREIGN PATENT DOCUMENTS

JP 2004-220315 8/2004

(Continued)

OTHER PUBLICATIONS

"Rechargeable Wireless Mouse," Pocket-lint, UK Jun. 14, 2007. www.pocket-lint.co.uk/news/news.phtml/7410/8434/Saitek-Mouse-Obsidian-Rechargeable-Wireless.phtml.

(Continued)

*Primary Examiner* — Melissa J Koval
*Assistant Examiner* — Alexis Boateng
(74) *Attorney, Agent, or Firm* — Westman, Champlin & Kelly, P.A.

(57) ABSTRACT

Concepts for forming an electrical connection between devices are disclosed. A cord for transferring electrical power and signals can be provided to connect a first device to a second device. One or more magnetic couplings can be provided to exert magnetic forces between the cord and the first device and/or between the cord and the second device. The one or more magnetic couplings can allow transfer of electrical power and signals therethrough.

18 Claims, 7 Drawing Sheets

U.S. PATENT DOCUMENTS

| | | | |
|---|---|---|---|
| 2004/0233168 A1* | 11/2004 | Christenson | 345/163 |
| 2004/0252106 A1* | 12/2004 | Koh | 345/163 |
| 2005/0152111 A1* | 7/2005 | Skurdal et al. | 361/686 |
| 2005/0219208 A1 | 10/2005 | Eichenberger et al. | |
| 2006/0007147 A1 | 1/2006 | Lee | |
| 2006/0145663 A1 | 7/2006 | Shiff et al. | |
| 2006/0221055 A1* | 10/2006 | Chang et al. | 345/163 |
| 2007/0072442 A1* | 3/2007 | DiFonzo et al. | 439/39 |
| 2007/0141860 A1 | 6/2007 | Hernandez et al. | |
| 2008/0045161 A1* | 2/2008 | Lee et al. | 455/73 |
| 2008/0136366 A1* | 6/2008 | Lee | 320/103 |

FOREIGN PATENT DOCUMENTS

| | | |
|---|---|---|
| KR | 10-1998-0010692 | 4/1998 |
| KR | 10-2001-0073664 | 8/2001 |
| KR | 10-2003-0051027 | 6/2003 |
| KR | 10-2004-0036478 | 4/2004 |

OTHER PUBLICATIONS

"A4Tech BatteryFree Mouse", www.a4tech.com/en/media/Overclockers%20Australia1.htm, Australia, Nov. 2004.

"Si670M Bluetooth Wireless Notebook Mouse," www.us.kensington.com/html/12635.html, Jun. 14, 2007.

International Search Report and Written Opinion for Intl. Serial. No. PCT/US2008/065915, dated Dec. 31, 2008.

Non-Final Office Action dated Aug. 14, 2009 for U.S. Appl. No. 11/763,951, filed Jun. 15, 2007.

* cited by examiner

ELECTRICAL CONNECTION BETWEEN DEVICES

The present application is a continuation of and claims priority of U.S. patent application Ser. No. 11/763,951, filed Jun. 15, 2007, the content of which is hereby incorporated by reference in its entirety.

BACKGROUND OF THE INVENTION

Forming an electrical connection between devices can be useful in many situations. For example, computing systems such as personal computers, hand-held or laptop devices, multi-processor systems, set top boxes, network PCs, mini computers, and the like typically receive input from a user via a device such as a keyboard and/or a mouse. These types of input devices can be attached to a processing unit of the computing systems by a wired connection. Signals generated by operations such as pressing an actuable switch on a mouse are provided via the wired connection so that the computing device can process the inputs provided by a user. In another situation, an input device includes data stored in memory that is transferred to a computing system. These devices can include watches, mobile devices, personal digital assistants, cellular telephones and cameras. The data can be transferred via a wired connection to the computing system such that the data can be stored and/or manipulated by the computing system. If desired, the computing system can transmit electrical signals to these devices for purposes of synchronization.

Furthermore, input devices may include a rechargeable power store for powering the input devices. The internal power store located within the devices has a finite amount of energy stored therein. When the devices are unconnected to any type of external device under normal operation, normal usage of the devices will dissipate the energy stored within the power supply. Eventually, it may be necessary to replenish or recharge the power store in order for a user to continue to use the devices.

The discussion above is merely provided for general background information and is not intended to be used as an aid in determining the scope of the claimed subject matter.

SUMMARY OF THE INVENTION

Concepts presented herein relate to forming an electrical connection between devices for charging and/or communication. Electrical power and data signals can be supplied by a first device through a cord to a second device. The cord can be adapted to form a magnetic coupling with the first device and/or the second device. When the cord is connected to both the first device and the second device, transfer of electrical power and data signals between the devices can be provided. In addition, one of the devices can be adapted to transmit wireless signals to the other device and remain in operation while coupled to the cord.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
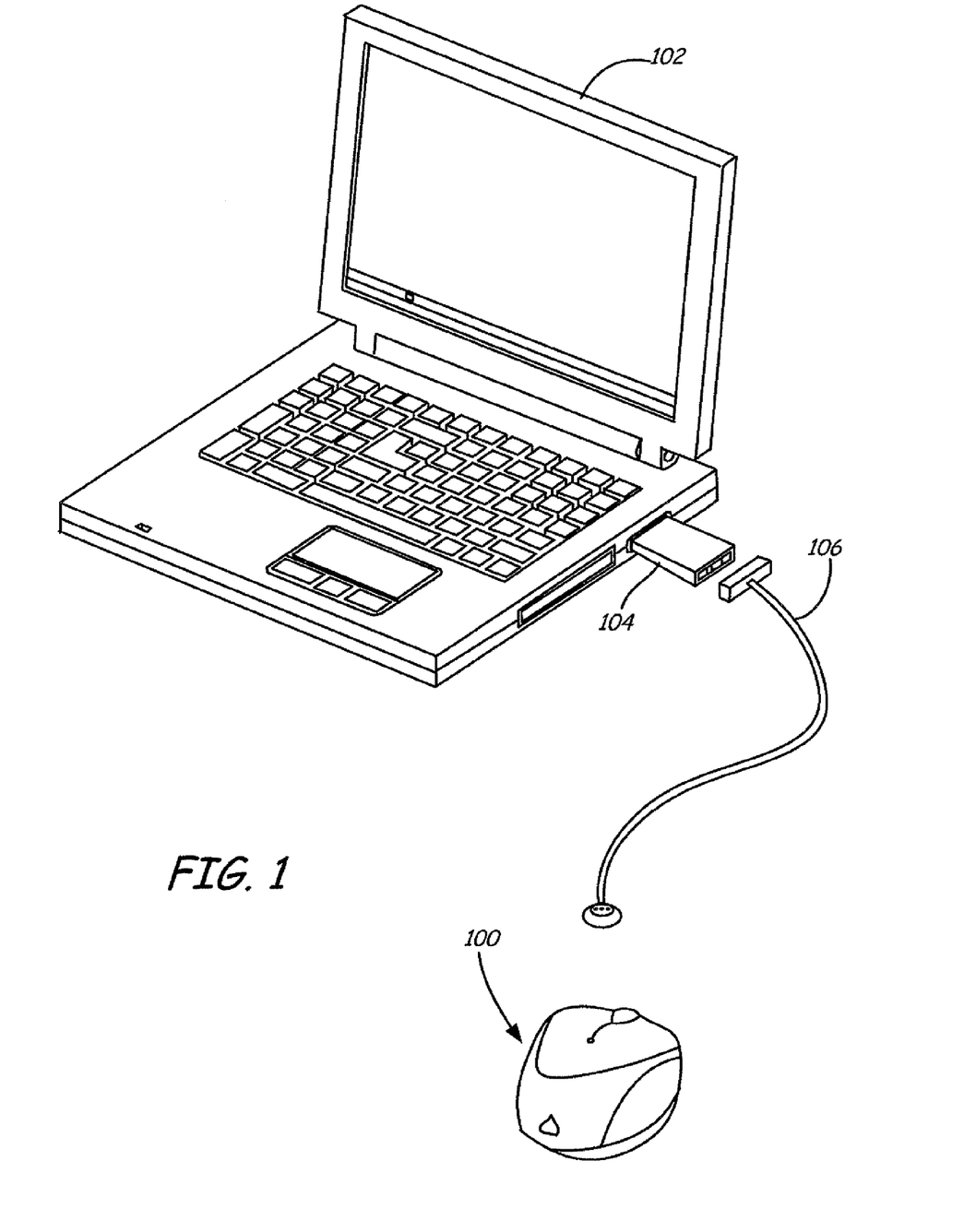
FIG. 1 is an isometric view of an electrical connection system.

FIG. 1 is an isometric view of an input device 100 that interfaces with a computer 102, which also operates as a charging and/or communication device for input device 100. Input device 100 includes several components for interfacing with computer 102 to perform various tasks. Input device 100 is illustrated as a mouse, although other input devices can also be used such as game controllers, keyboards, scanners, sensors, watches, cameras, personal digital assistants, cellular telephones, etc. and any other devices that can receive and/or transmit input as well as receive power from computer 102. Likewise, computer 102 is illustrated as a laptop computer although other devices used for communication with and/or charging input device 100, such as, but not limited to desktop computers, mobile devices, personal digital assistants, cellular telephones, memory storage units, etc.

Input device 100 can communicate wirelessly through a transceiver dongle 104 that is directly coupled to computer 102. In addition, transceiver dongle 104 can be adapted to transmit power from computer 102 to input device 100 through a cord 106. When input device 100 and transceiver dongle 104 are coupled through cord 106, transceiver dongle 104 can transfer electrical power (i.e. energy) to input device 100 in order to recharge a power store within input device 100. Additionally, signals can be transferred from input device 100 to computer 102 through cord 106. In alternative embodiments, computer 102 can be configured to transmit signals to input device 102.

During recharging of the power store, device 100 and cord 106 are configured to allow operation of input device 100 as in normal operation. For example, cord 106 can be positioned within a recess provided in input device 100 such that cord 106 moves therewith and a position of device 100 can still be sensed by a sensor within input device 100 and transmitted to transceiver dongle 104. Furthermore, computer 102 can be adapted to provide an indicator such as an icon displayed thereon that indicates electrical power and/or signals are being transferred between input device 100 and computer 102. The input device 100 can also then be configured to operate in a wired mode such that actuation of components of the input device 100 are sent to computer 102 through cord 106. This wired mode can be useful in situations for added security or when wireless devices are prohibited such as in airplanes or hospitals. Although herein illustrated as an external component of computer 102, a transceiver to communicate wirelessly with input device 100 can be an internal component of computer 102. Furthermore, a connector for receiving cord 106 can be integrated into a form factor of computer 102, as desired.

Figure 2:
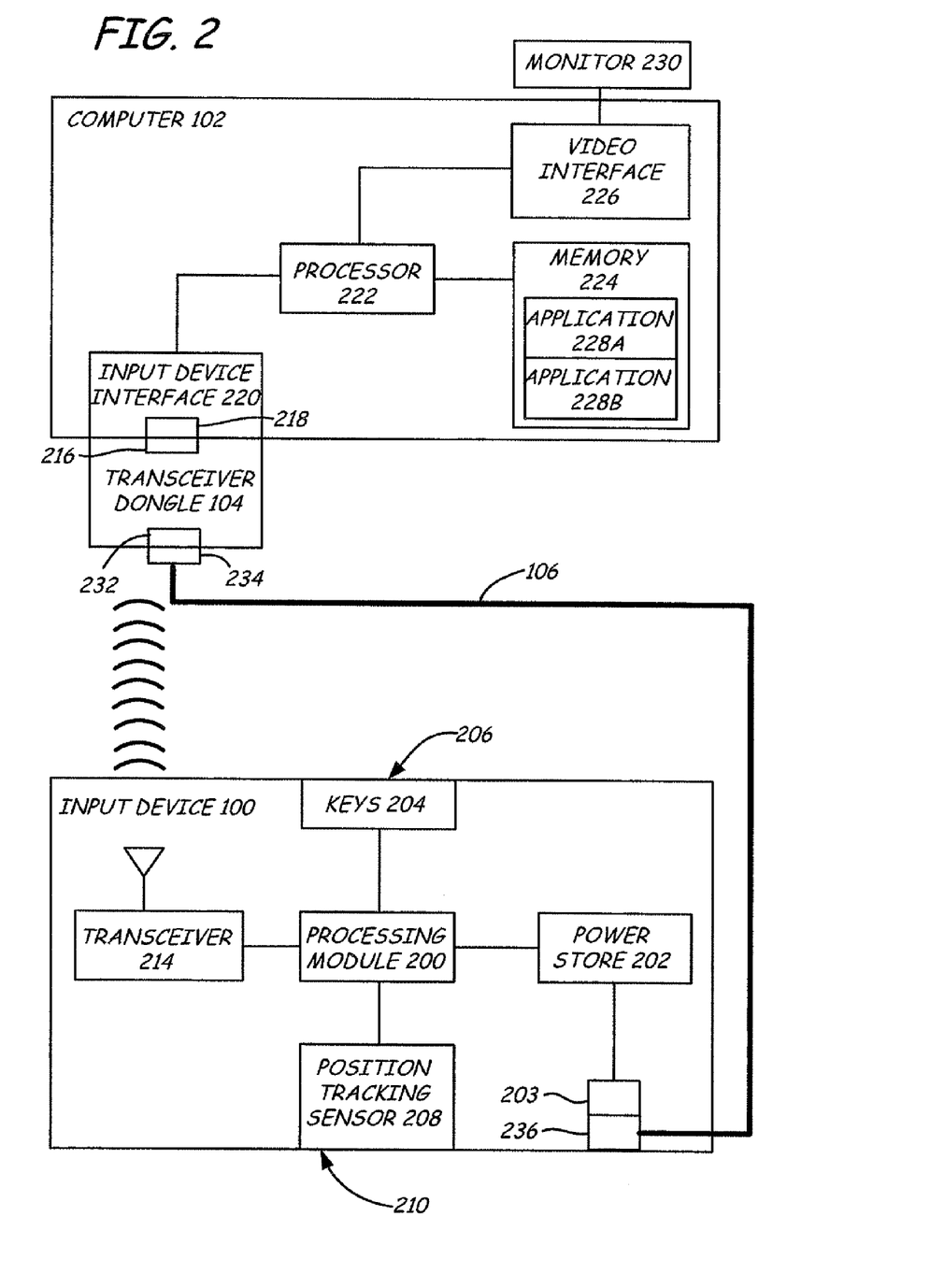
FIG. 2 is a block diagram of components in an electrical connection system.

FIG. 2 provides a more detailed diagram of internal components illustrated in FIG. 1. As illustrated in FIG. 2, input device 100 includes a processing module 200 coupled to a power store 202, which is adapted to provide power to the processing module 200. In one embodiment, power store 202 includes a rechargeable battery and is coupled to a connector 203 to receive power provided through cord 106. Input device 100 also includes a set of keys 204 positioned on a top surface 206 of input device 100 and a position tracking sensor 208 positioned on a bottom surface 210 of input device 100. The positioning of keys 204 and position tracking sensor 208 is illustrative only, and can be positioned in several locations as desired.

Keys 204 can be any form of input mechanism such as buttons, wheels, balls, switches, pads, etc. that can be actuated by a user. Upon actuation of any of the keys 204, processing module 200 provides a signal indicative thereof to a transceiver 214. Transceiver 214 can be any type of wireless communication module that transmits signals to transceiver dongle 104 that is directly coupled to computer 102. In one embodiment, transceiver 214 is a Bluetooth® compatible transceiver for wirelessly transmitting signals to and receiving signals from transceiver dongle 104. Other types of transceivers include wireless USB.

Position tracking sensor 208 can be any type of tracking sensor such as a track ball, optical sensor, etc. Relative movements of input device 100 or a portion thereof correspond to movements of a cursor in a plane as detected by position tracking sensor 208. Transceiver 214 can send a signal indicative of movement sensed by position tracking sensor 208 to transceiver dongle 104. For example, when surface 210 is positioned on a flat surface such as a table top, sensor 208 tracks the position of device 100 on the table top. If sensor 208 is a track ball sensor, movement of the track ball relative to a device housing is sensed to provide the position.

Transceiver dongle 104 includes a connector 216 that is adapted to be coupled to a corresponding connector 218 on an input device interface 220 of computer 102. Input device interface 220 receives signals from input device 100, in particular from transceiver dongle 104 that are received from transceiver 214. Computer 102 also includes a processing unit 222, memory 224 and a video interface 226. Memory 224 can include one or more applications, such as applications 228A-B. Additionally, video interface 226 is coupled to a monitor 230 to display images thereon. By operating input device 100, a user can interact with any of the applications 228A-B for display on monitor 230.

To form an electrical connection between input device 100 and computer 102, cord 106 can be coupled to transceiver dongle 104 and input device 100. Transceiver dongle 104 includes a connector 232 that mates with a corresponding connector 234 provided on cord 106. Cord 106 also includes second connector 236 that interfaces with connector 203 on input device 100. When coupled to transceiver dongle 104 and connector 203 of input device 100, electrical power transmission can be provided to recharge power store 202. Additionally, transfer of electrical signals can be provided between input device 100 and computer 102. Connector 203 is recessed from surface 210 to allow connector 236 to be connected thereto such that connector 236 can be flush with or recessed from surface 210. As a result, a user is still able to operate input device 100 while power store 202 is being recharged. If desired, signals sent by transceiver 114 can instead be sent via cord 106, for example when wireless communication between input device 100 and computer 102 is prohibited.

Figure 3:
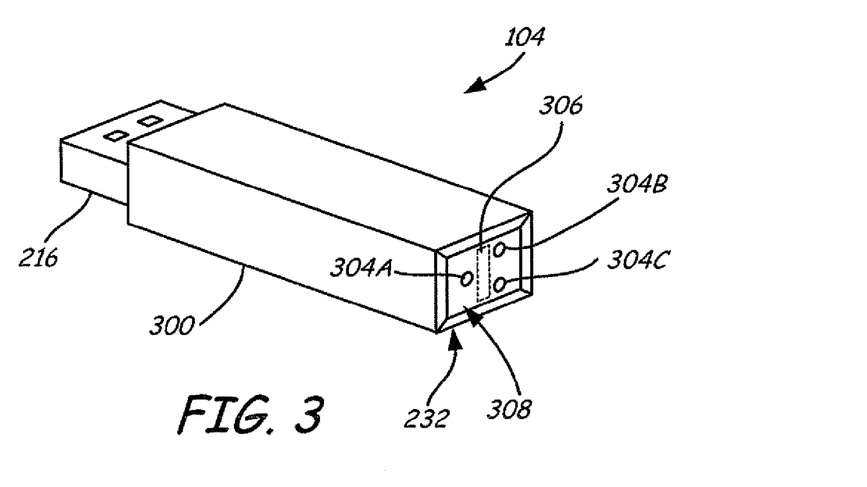
FIG. 3 is an isometric view of a dongle.

FIG. 3 is an isometric view of transceiver dongle 104. Transceiver dongle 104 includes a housing 300 with connectors 216 and 232 positioned on either end of the housing. Housing 300 includes transceiver circuitry positioned therein that is adapted to communicate wirelessly with transceiver 214 of input device 100. Furthermore, housing 300 includes electrical wiring adapted to transfer electrical power and signals from connector 216 to connector 232. In one embodiment, connector 216 is a Universal Serial Bus (USB) connector, although other types of connections can be used.

Connector 232 includes a plurality of electrical interface elements, herein connector pins 304A, 304B and 304C. These connector pins 304A-304C are adapted to interface with corresponding pins on connector 234 of cord 106 to form an electrical connection from connector 216 through wires in housing 300 and to connector 234. Connector 232 also includes a magnet 306 adapted to attract a corresponding magnet on connector 234 and a cup-shaped recess 308 extending inwardly from housing 300 to receive an outwardly extending protrusion from connector 234 of cord 106. Cup-shaped recess 308 includes a central rectangular recessed surface surrounded by four beveled surfaces adjacent thereto. The beveled surfaces aid in forming a cup shape to receive connector 234. If desired, the cup-shaped recess 308 can be asymmetrical to aid a person in aligning connector 234 with connector 232. For example, one of the beveled surfaces can be longer than a beveled surface on the opposite side of the recess 308 to provide a physical guide for aligning connector 232 with connector 234.

Figure 4:
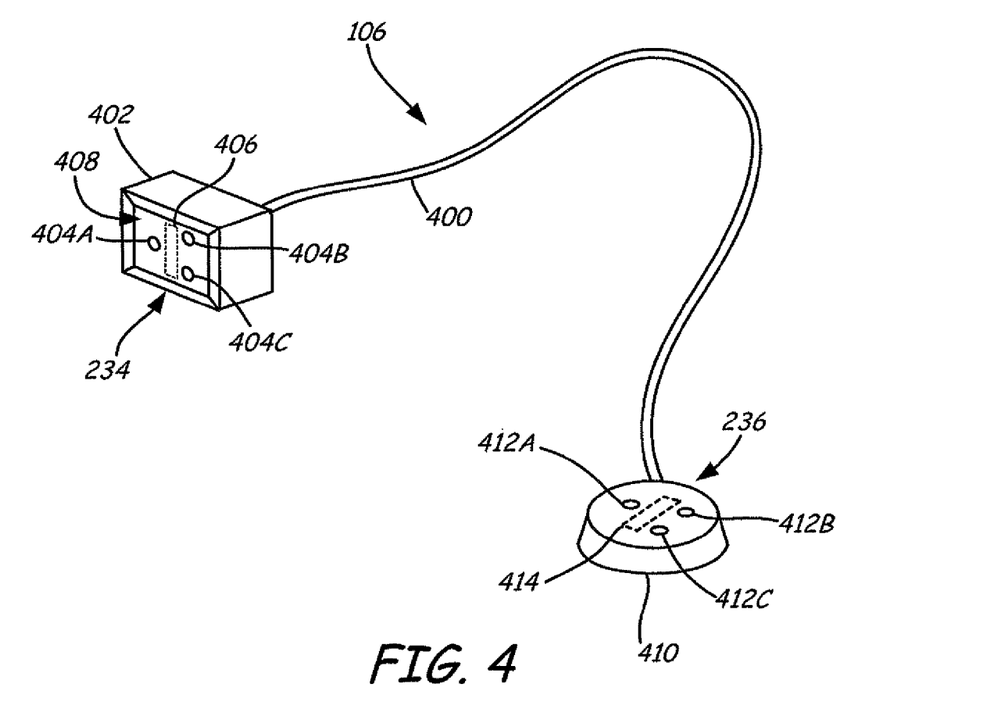
FIG. 4 is an isometric view of a cord.

FIG. 4 is an isometric view of cord 106, which includes an elongated cable 400 extending between connectors 234 and 236. Connector 234 includes a housing 402, a plurality of interface elements, herein connector pins 404A, 404B and 404C that are adapted to be coupled to pins 304A, 304B and 304C, respectively, of connector 232. Additionally, connector 234 includes a magnet 406 and an outwardly extending protrusion 408. Protrusion 408 includes a central rectangular protruding surface with four beveled surfaces adjacent thereto. The beveled surfaces are configured to mate with corresponding surfaces in recess 308 of connector 232. As such, these beveled surfaces can also be asymmetrical to match the surfaces of recess 308.

Connector 236 includes a housing 410 with connector pins 412A, 412B and 412C and includes a magnet 414. Housing 410 is disc shaped and adapted to fit within a recess in input device 100. Connector pins 404A-C are electrically coupled to connector pins 412A-C, respectively, through wires provided within cable 400.

Figure 5:
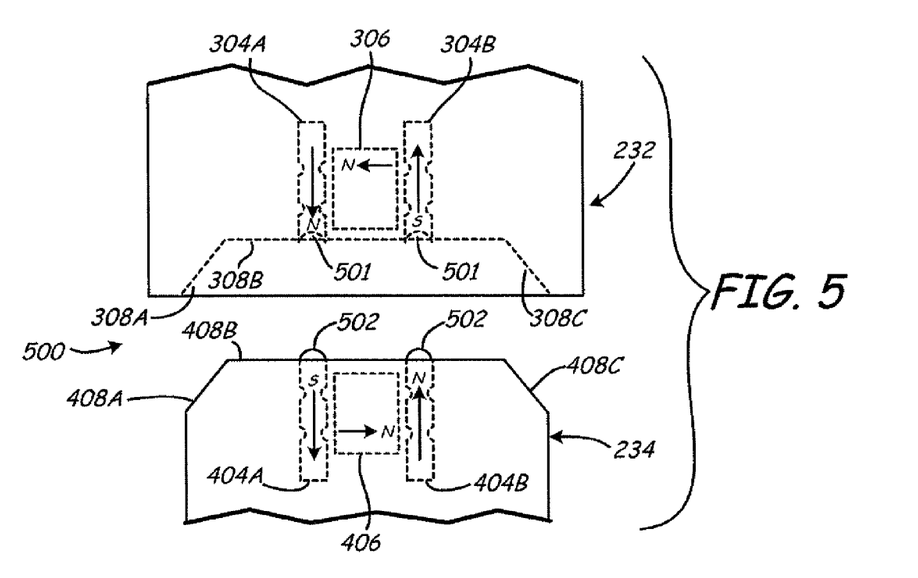
FIG. 5 is a schematic view of a magnetic coupling between a dongle and a cord.

FIG. 5 is a schematic view of a magnetic coupling 500 between connector 232 of transceiver dongle 104 and connector 234 of cord 106. As illustrated, cup-shaped recess 308 of transceiver dongle 104 is aligned to mate with protrusion 408 of connector 234. For example, surfaces 308A, 308B and 308C of recess 308 are adapted to mate with surfaces 408A, 408B and 408C of protrusion 408. If desired, one of the beveled surfaces of recess 308 and a corresponding surface of protrusion 408 can be of a different length and/or angle than the other beveled surfaces of recess 308 and protrusions 408. For example, both surfaces 308A and 408A can be of a longer length and a different angle than surface 308C and 408C, respectively. This asymmetric arrangement can provide a more visual alignment mechanism for a user when connecting connectors 232 and 234. In addition to physical alignment of the recess 308 and protrusion 408, connectors 232 and 234 can include other mechanisms to aid in aligning and connecting pins 304A-304C with pins 404A-404C. For example, pins 304A-304C include concave end portions 501 to receive convex end portions 502 of pins 404A-404C.

A magnetic coupling is also used to secure connectors 232 and 234 together and form an electrical connection from transceiver dongle 104 to cord 106. Magnetizing pins 304A-C and 404A-C with magnetic forces having opposite polarization can aid in ensuring that pins 304A-C and 404A-C are attracted and drawn towards each other and in a proper orientation. Additionally, the magnetization of the pins can resist being separated once they are engaged. Magnet 306 includes a magnetic orientation where North is in a direction toward pin 304A and magnet 406 includes a magnetic orientation where North faces away from pin 404A. As a result, magnetization of pin 304A can be oriented in a direction where a North pole is proximate recess 308 and magnetization of pin 404A is oriented in a direction where a South pole is proximate protrusion 408. Pins 304B and 304C will be oriented in a magnetic direction opposite of pin 304A such that pins 304B-C include a South pole proximate recess 308. Likewise, pins 404B and 404C will be oriented in a magnetic direction opposite of pin 404A such that pins 404B-C include a North pole proximate protrusion 408.

When brought in close proximity and in proper alignment, pins 304A-C and 404A-C will be brought into contact due to the magnetic force of the pins as well as magnets 306 and 406. When in an improper alignment, magnetization of the pins and magnets 306 and 406 will repel connection of the pins. While connected, convex end portions 502 of pins 404A-C are secured in concave portions 501 of pins 304A-C, respectively. The North pole of pin 304A is aligned with and connected to the South pole of pin 404A. Likewise, the South poles of pins 304B-C are aligned with and connected to the North poles of pins 404B-C, respectively. The connection between the pins allows for the transfer of electrical power that can be sent to power store 202. Pins 304A-C and 404A-C can be drill rods that are formed of a ferrous material such as steel and have copper plating near end portions 501 and 502.

Figure 6:
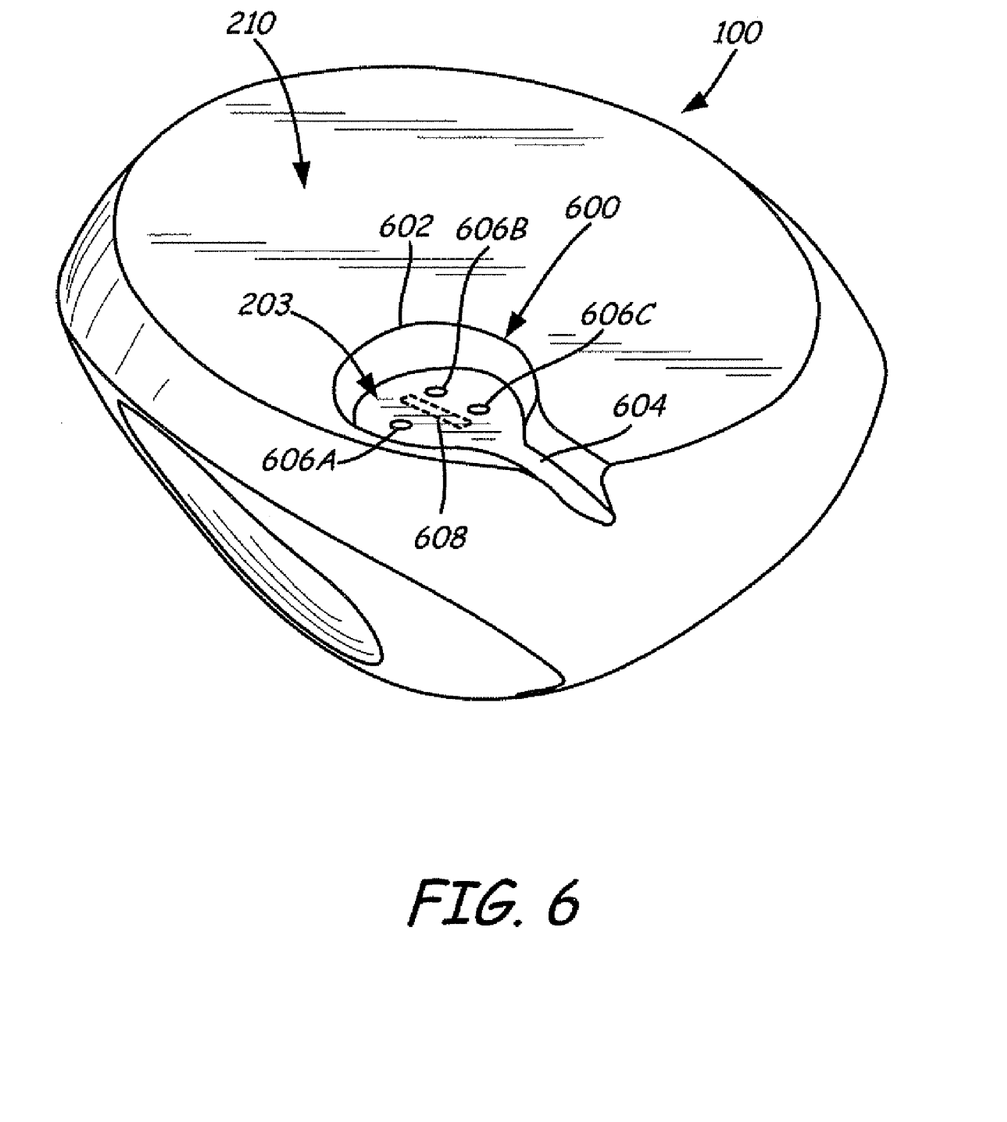
FIG. 6 is an isometric bottom view of an input device.

FIG. 6 is an isometric view of bottom surface 210 of input device 100. Bottom surface 210 includes a connector receiving portion 600 that includes a connector recess 602 and a cable recess 604. Connector recess 602 receives connector 236 and cable recess 604 receives cable 400 such that connector 236 and cable 400 can be flush with or recessed from surface 210 so as to not interfere with positioning of device 100. Additionally, connector 203 is illustrated that includes electrical interface elements, herein connector pins 606A, 606B and 606C that connect to pins 412A, 412B and 412C of connector 236, respectively. Pins 606A-C are electrically coupled to power store 202 within device 100. Connector 203 also includes a magnet 608 to aid in forming a magnetic coupling with magnet 414 of connector 236.

Figure 7:
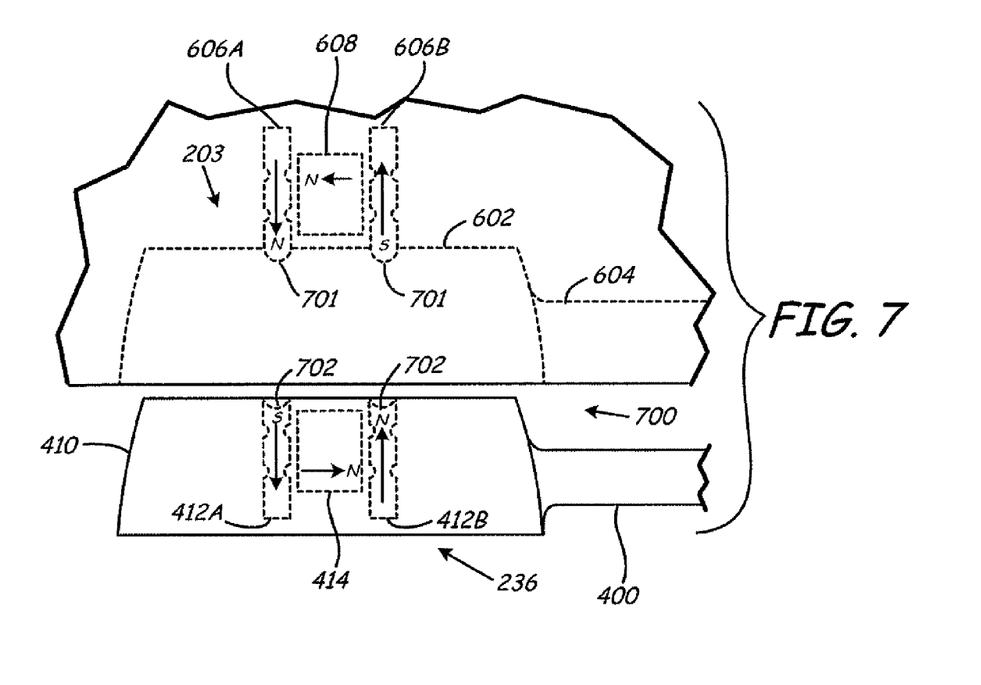
FIG. 7 is a schematic view of a magnetic coupling between a cord and an input device.

FIG. 7 is a schematic view of a magnetic coupling 700 between connector 203 of input device 100 and connector 236 of cord 106. To connect connector 203 with connector 236, a user can position input device 100 over connector 236 such that housing 410 can enter recess 602 and cable 400 can enter recess 604. Accordingly, pins 606A-C include convex end portions 701 that are received by concave end portions 702 of pins 412A-C. When brought in close proximity and in proper alignment, magnetic forces can bring pins 412A-C in contact with pins 606A-C, respectively. When in an improper alignment, magnetic forces will repel connection between connectors 203 and 236. As illustrated, magnetic orientation of magnet 414 is in an opposite orientation from magnet 608. Magnet 414 has a magnetic North orientation in a direction away from pin 412A and toward pins 412B-C. This orientation causes pin 412A to have a South pole facing connector 203 while pins 412B-C have North poles facing connector 203. Magnet 608 is used to magnetically orient pins 606A-C as well. Magnet 608 has a North orientation in a direction toward pin 606A, causing pin 606A to have a North pole facing connector 236 and pins 606B-C having South poles facing connector 236. Magnetic forces in the pins cause connection of connectors 203 and 236 such that end portions 701 are disposed in end portions 702. Thus, an electrical connection is formed between pins 412A-C and pins 606A-C, respectively.

Figure 8:
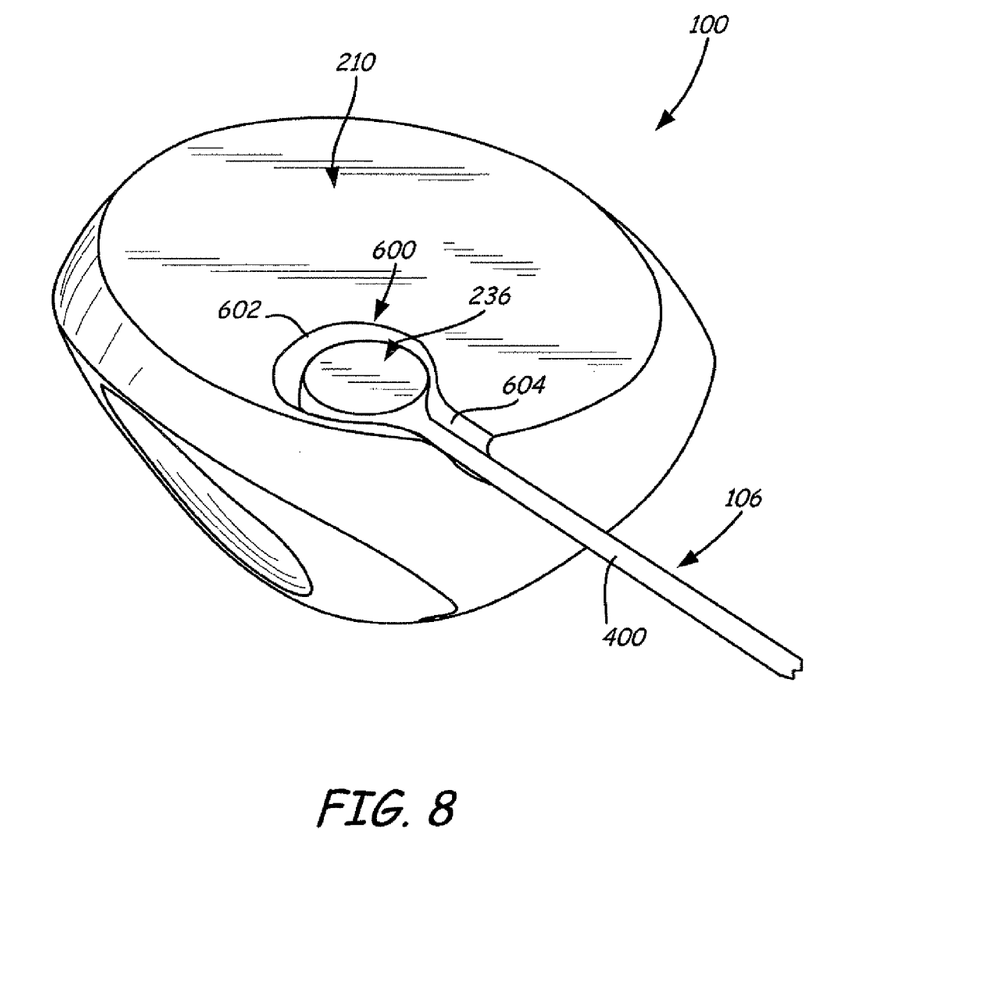
FIG. 8 is an isometric bottom view of an input device having a cord attached thereto.
Figure 9:
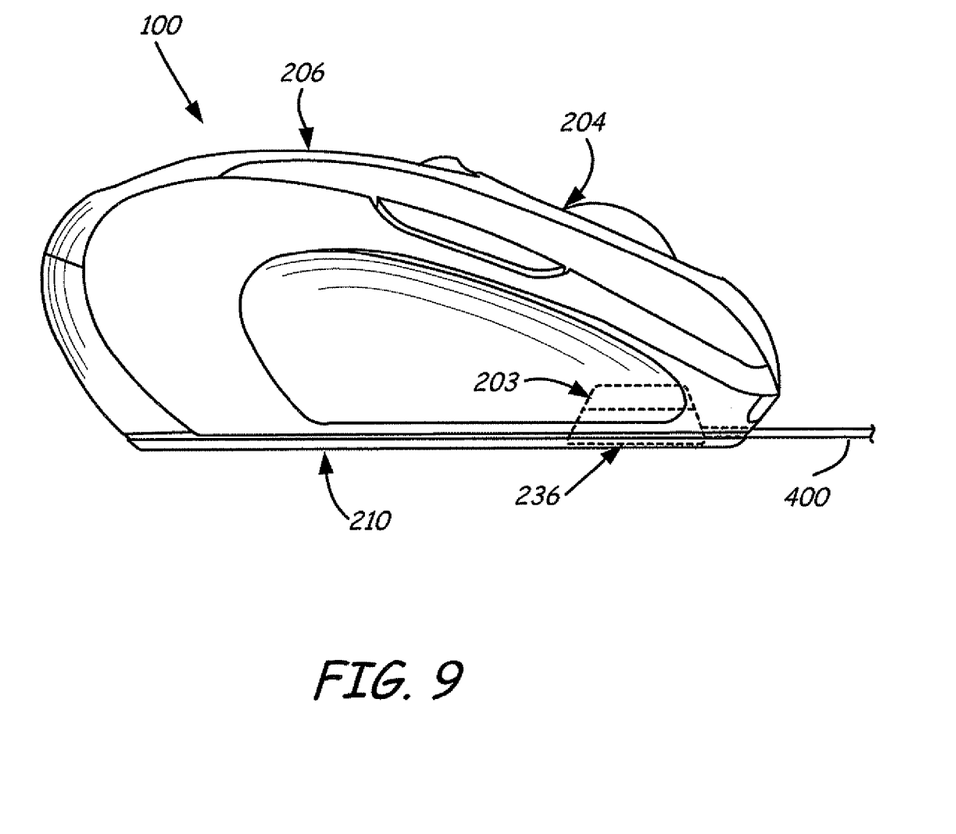
FIG. 9 is a side view of an input device having a cord attached thereto.

FIG. 8 illustrates a bottom view of cord 106 connected to device 100 and FIG. 9 illustrates a side view of cord 106 connected to device 100. While connected, cord 106 is flush or recessed from surface 210 of device 100 to allow cord 106 to move with device 100. Thus, a user can operate device 100 while keys 204 and position tracking sensor 208 remain operational.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of charging an input device, comprising:
providing a wireless transceiver and a rechargeable power store for powering the wireless transceiver in the input device;
providing a sensor to monitor a position of the input device;
forming a first magnetic coupling between a cord and a charging device to exert magnetic forces between the cord and the charging device;
forming a second magnetic coupling between the cord and the input device to exert magnetic forces between the cord and the input device;
supplying, across the cord, an electric current to the input device from the charging device so as to recharge the power store;
utilizing the wireless transceiver to form a wireless communication connection between the input device and the charging device that enables the input device to wirelessly transmit the position of the input device to the charging device; and
utilizing the cord to form a wired communication connection between the input device and the charging device that enables the input device to transmit the position of the input device to the charging device through the wired communication connection.

2. The method of claim 1, wherein the charging device includes a transceiver dongle that receives signals from the wireless transceiver, and wherein said supplying of the electric current to the input device from the charging device comprises supplying the electric current through the transceiver dongle to the input device.

3. The method of claim 2, wherein said supplying of the electric current further comprises supplying across the cord between the transceiver dongle and the input device.

4. The method of claim 3 wherein forming the first magnetic coupling further comprises forming a magnetic coupling that includes a first magnet positioned in the transceiver dongle and a second magnet positioned on the cord, and wherein the second magnetic coupling includes a third magnet positioned on the cord and a fourth magnet positioned on the input device.

5. The method of claim 1 and further comprising:
magnetizing pins on the charging device and magnetizing a first set of pins on the cord to form the first magnetic coupling; and
magnetizing a second set of pins on the cord and pins on the input device to form the second magnetic coupling.

6. The method of claim 1 wherein a first set of two magnets are utilized to form the first magnetic coupling and a second set of two magnets are utilized to form the second magnetic coupling, the first set of two magnets being separate and distinct from the second set of magnets.

7. A method of charging an input device, comprising:
receiving through a set of magnetic pins that is integrated into the input device, an electric current utilized to charge a power store within the input device; and
transmitting, by way of a wireless interface to the input device, data indicative of a location of the input device.

8. The method of claim 7, wherein transmitting comprises transmitting from a wireless transceiver.

9. The method of claim 7, wherein receiving comprises receiving by way of a cord connected to the input device by way of a magnetic coupling.

10. The method of claim 7, wherein receiving comprises receiving by way of a physical connection to a transceiver dongle.

11. The method of claim 7, wherein receiving comprises receiving by way of a cord that is removably connected to the input device.

12. The method of claim 7, wherein receiving comprises receiving by way of a cord that is magnetically coupled to the input device.

13. A method of charging an input device, comprising:
magnetically coupling a first end of a cord to a charging device;
magnetically coupling a second end of the cord to the input device; and
receiving an electric current through the cord that charges a power store of the input device while the input device at the same time wirelessly transmits data indicative of a location of the input device.

14. The method of claim 13, wherein the first end of the cord is magnetically coupled to the charging device utilizing a set of magnetic pins.

15. The method of claim 13, wherein the first end of the cord is indirectly coupled to the charging device utilizing a transceiver dongle.

16. The method of claim 13, wherein the second end of the cord is magnetically coupled to the input device utilizing a set of magnetic pins.

17. The method of claim 13, wherein the first end of the cord is magnetically coupled to the charging device utilizing a first set of magnetic pins, and wherein the second end of the cord is magnetically coupled to the input device utilizing a second set of magnetic pins.

18. The method of claim 13, wherein transmitting comprises transmitting wirelessly to a transceiver dongle to which the input device is also connected by way of the cord.

* * * * *